(12) United States Patent
Jiang

(10) Patent No.: US 12,114,109 B2
(45) Date of Patent: Oct. 8, 2024

(54) IMAGE COLOR ADJUSTMENT METHOD AND APPARATUS AND UNMANNED AERIAL VEHICLE

(71) Applicant: AUTEL ROBOTICS CO., LTD., Guangdong (CN)

(72) Inventor: Defei Jiang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 283 days.

(21) Appl. No.: 17/526,138

(22) Filed: Nov. 15, 2021

(65) Prior Publication Data

US 2022/0078389 A1    Mar. 10, 2022

Related U.S. Application Data

(63) Continuation of application No. PCT/CN2020/090268, filed on May 14, 2020.

(30) Foreign Application Priority Data

May 15, 2019    (CN) .......................... 201910403038.6

(51) Int. Cl.
*H04N 9/77*    (2006.01)
*B64C 39/02*    (2023.01)
(Continued)

(52) U.S. Cl.
CPC ............ *H04N 9/77* (2013.01); *B64C 39/024* (2013.01); *B64D 47/08* (2013.01); *H04N 9/68* (2013.01); *B64U 10/13* (2023.01); *B64U 2101/30* (2023.01)

(58) Field of Classification Search
CPC ............ H04N 9/77; H04N 9/68; H04N 23/76; H04N 23/88; H04N 9/64; B64C 39/024; B64D 47/08; B64U 10/13; B64U 2101/30
See application file for complete search history.

(56) References Cited

U.S. PATENT DOCUMENTS 5,177,599 A    1/1993    Takagi et al.
7,656,458 B2 *  2/2010    Hoshuyama ......... H04N 23/843
                                                        348/366

(Continued)

FOREIGN PATENT DOCUMENTS

CN    103139572 A    6/2013
CN    103546732 A    1/2014
(Continued)

OTHER PUBLICATIONS

The International Search Report mailed Aug. 12, 2020; PCT/CN2020/090268 (Translation included).

*Primary Examiner* — Gevell V Selby

(57) ABSTRACT

Embodiments of the disclosure relate to the field of image processing technologies, and disclose an image color adjustment method and apparatus and an unmanned aerial vehicle (UAV). The image color adjustment method is applicable to an image collection device. The method includes: determining a current photographing parameter of the image collection device during collection of a to-be-processed image, where the current photographing parameter includes a current exposure and a current color temperature; selecting, according to the current exposure and the current color temperature, an optimal color channel gain matching the current exposure and the current color temperature; and adjusting a color of the to-be-processed image according to the optimal color channel gain.

21 Claims, 3 Drawing Sheets

(51) Int. Cl.
*B64D 47/08* (2006.01)
*B64U 10/13* (2023.01)
*B64U 101/30* (2023.01)
*H04N 9/68* (2023.01)

(56) References Cited

U.S. PATENT DOCUMENTS

| | | | |
|---|---|---|---|
| 2003/0052978 | A1 | 3/2003 | Kehtarnavaz et al. |
| 2016/0295189 | A1* | 10/2016 | Fujiwara ............... H04N 23/743 |
| 2018/0208309 | A1* | 7/2018 | Wang ...................... B64C 25/56 |
| 2020/0226720 | A1* | 7/2020 | Mirzaei Domabi ... H04N 23/88 |
| 2020/0228770 | A1* | 7/2020 | Yu .......................... H04N 23/88 |

FOREIGN PATENT DOCUMENTS

| CN | 104320642 A | 1/2015 |
|---|---|---|
| CN | 104869379 A | 8/2015 |
| CN | 105940673 A | 9/2016 |
| CN | 106713887 A | 5/2017 |
| CN | 107454342 A | 12/2017 |
| CN | 108307139 A | 7/2018 |
| CN | 110121064 A | 8/2019 |

* cited by examiner

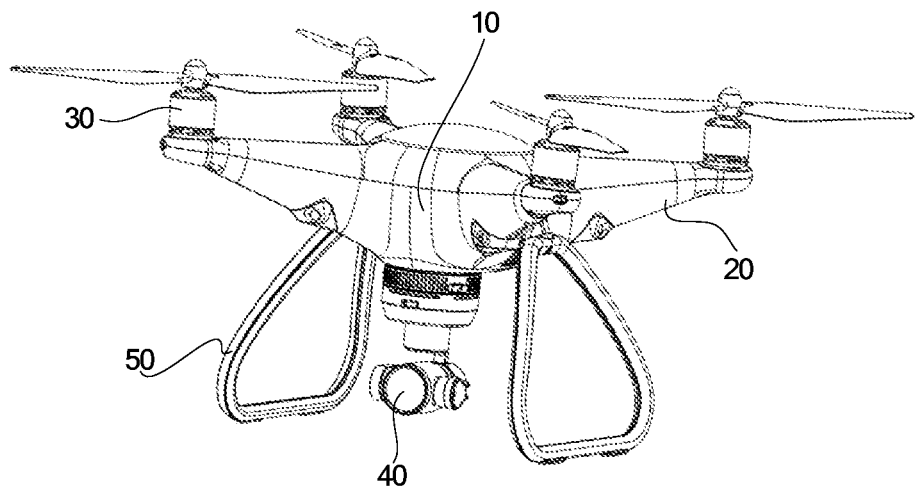

FIG. 1

```
Determine a current photographing parameter of an image
collection device during collection of a to-be-processed image,    S200
where the current photographing parameter includes a current
       exposure and a current color temperature Select, according to the current exposure and the current color
temperature, an optimal color channel gain matching the current    S300
       exposure and the current color temperature Adjust a color of the to-be-processed image according to the   S400
              optimal color channel gain
```

FIG. 2

IMAGE COLOR ADJUSTMENT METHOD AND APPARATUS AND UNMANNED AERIAL VEHICLE

CROSS-REFERENCE TO RELATED APPLICATIONS

The present application is a continuation of International application No. PCT/CN2020/090268, filed on May 14, 2020, which claims priority to Chinese Patent Application No. 201910403038.6, filed on May 15, 2019, which is incorporated herein by reference in its entirety.

TECHNICAL FIELD

The present application relates to the field of image processing technologies, and in particular, to an image color adjustment method and apparatus and an unmanned aerial vehicle (UAV).

BACKGROUND

A UAV is a drone operated by a radio remote control device or a program control apparatus of the UAV and is frequently used for aerial photography. During aerial photography by the UAV, automatic white balancing is required for aerial videos and images, so that the videos and the images can accurately reflect a color of a subject. However, the videos and the images after the automatic white balance processing present only a monotonous color style. The color style cannot be changed with an actual photographing status.

SUMMARY

Embodiments of the disclosure provide an image color adjustment method and apparatus and a UAV. By means of the embodiments of the disclosure, a color style of a to-be-processed image can be changed with an actual photographing status. In this way, the to-be-processed image can accurately reflect a color of a subject and present a variety of color styles.

In order to resolve the foregoing technical problem, the embodiments of the disclosure adopt a technical solution as follows: An image color adjustment method is provided. The image color adjustment method is applicable to an image collection device of a UAV, and includes:

determining a current photographing parameter of the image collection device during collection of a to-be-processed image, where the current photographing parameter includes a current exposure and a current color temperature;

selecting, according to the current exposure and the current color temperature, an optimal color channel gain matching the current exposure and the current color temperature; and adjusting a color of the to-be-processed image according to the optimal color channel gain.

Optionally, each candidate color temperature index interval corresponds to at least two candidate exposures, and each of the at least two candidate exposures corresponds to one candidate color channel gain.

The selecting, according to the current exposure and the current color temperature, an optimal color channel gain matching the current exposure and the current color temperature includes:

determining, as a target color temperature index interval, a candidate color temperature index interval including the current color temperature;

determining, as a target exposure, a candidate exposure matching the current exposure from candidate exposures corresponding to the target color temperature index interval; and selecting, as the optimal color channel gain, a candidate color channel gain corresponding to the target exposure.

Optionally, the method further includes:

if the candidate exposures corresponding to the target color temperature index interval do not include the candidate exposure matching the current exposure, calculate a target color channel gain corresponding to the current exposure by means of interpolation calculation, and select the target color channel gain as the optimal color channel gain.

Optionally, the candidate color channel gain includes a color channel type and a gain adjustment value corresponding to the color channel type.

Optionally, the calculating a target color channel gain corresponding to the current exposure by means of interpolation calculation includes:

determining, as reference color channel gains, at least two candidate color channel gains having a same color channel type from candidate color channel gains corresponding to the target color temperature index interval;

determining, as reference exposures, candidate exposures corresponding to the reference color channel gains;

constructing an interpolation function according to the reference exposures and gain adjustment values of the reference color channel gains; and calculating the target color channel gain corresponding to the current exposure according to the interpolation function and the current exposure.

Optionally, the color channel type includes a red channel or a blue channel.

The adjusting a color of the to-be-processed image according to the optimal color channel gain includes:

when a color channel type of the optimal color channel gain is a red channel, increasing or reducing a color value of the red channel by using the gain adjustment value; or when a color channel type of the optimal color channel gain is a blue channel, increase or reduce a color value of the blue channel by using the gain adjustment value.

Optionally, when the color channel type of the optimal color channel gain is a red channel, the color of the to-be-processed image is redder or greener.

Optionally, when the color channel type of the optimal color channel gain is a blue channel, the color of the to-be-processed image is bluer or yellower.

Optionally, before the determining a current photographing parameter of the image collection device during collection of a to-be-processed image, the method further includes:

adjusting the to-be-processed image by means of automatic exposure and automatic white balancing.

Optionally, the determining a current color temperature of the image collection device during collection of a to-be-processed image includes:

calculating a ratio of a predefined-color average value to a green-color average value for all white pixels in the to-be-processed image, where the white pixels are pixels in a predefined high grayscale range;

acquiring a preset color temperature curve; and determining the current color temperature according to the preset color temperature curve and the ratio.

Optionally, the predefined-color average value includes a red-color average value or a blue-color average value.

In order to resolve the foregoing technical problem, the embodiments of the disclosure adopt another technical solution as follows: An image color adjustment apparatus is provided. The image color adjustment apparatus is applicable to an image collection device of a UAV, and includes:

a determination module, configured to determine a current photographing parameter of the image collection device during collection of a to-be-processed image, where the current photographing parameter includes a current exposure and a current color temperature;

a selection module, configured to select, according to the current exposure and the current color temperature, an optimal color channel gain matching the current exposure and the current color temperature; and an adjustment module, configured to adjust a color of the to-be-processed image according to the optimal color channel gain.

Optionally, each candidate color temperature index interval corresponds to at least two candidate exposures, and each of the at least two candidate exposures corresponds to one candidate color channel gain.

The selection module is further configured to:

determine, as a target color temperature index interval, a candidate color temperature index interval including the current color temperature;

determine, as a target exposure, a candidate exposure matching the current exposure from candidate exposures corresponding to the target color temperature index interval; and select, as the optimal color channel gain, a candidate color channel gain corresponding to the target exposure.

Optionally, the selection module is further configured to:

if the candidate exposures corresponding to the target color temperature index interval do not include the candidate exposure matching the current exposure, calculate a target color channel gain corresponding to the current exposure by means of interpolation calculation, and select the target color channel gain as the optimal color channel gain.

Optionally, the candidate color channel gain includes a color channel type and a gain adjustment value corresponding to the color channel type.

Optionally, the selection module is further configured to:

determine, as reference color channel gains, at least two candidate color channel gains having a same color channel type from candidate color channel gains corresponding to the target color temperature index interval;

determine, as reference exposures, candidate exposures corresponding to the reference color channel gains;

construct an interpolation function according to the reference exposures and gain adjustment values of the reference color channel gains; and calculate the target color channel gain corresponding to the current exposure according to the interpolation function and the current exposure.

Optionally, the color channel type includes a red channel or a blue channel; and the adjustment module configured to:

when a color channel type of the optimal color channel gain is a red channel, increase or reduce a color value of the red channel by using the gain adjustment value; or when a color channel type of the optimal color channel gain is a blue channel, increase or reduce a color value of the blue channel by using the gain adjustment value.

Optionally, when the color channel type of the optimal color channel gain is a red channel, the color of the to-be-processed image is redder or greener.

Optionally, when the color channel type of the optimal color channel gain is a blue channel, the color of the to-be-processed image is bluer or yellower.

Optionally, the apparatus further includes:

a process module, configured to: before the current photographing parameter of the image collection device during collection of the to-be-processed image is determined, adjust the to-be-processed image by means of automatic exposure and automatic white balancing.

Optionally, the determination module is further configured to:

calculate a ratio of a predefined-color average value to a green-color average value for all white pixels in the to-be-processed image, where the white pixels are pixels in a predefined high grayscale range;

acquire a preset color temperature curve; and determine the current color temperature according to the preset color temperature curve and the ratio.

Optionally, the predefined-color average value includes a red-color average value or a blue-color average value.

In order to resolve the foregoing technical problem, the embodiments of the disclosure adopt another technical solution as follows: A UAV is provided, including:

a fuselage;

an arm, connected to the fuselage;

a power apparatus, disposed on the arm; and an image collection device, connected to the fuselage.

The image collection device includes:

at least one processor; and a memory, communicatively connected to the at least one processor. The memory stores instructions executable by the at least one processor. Execution of the instructions by the at least one processor causes the at least one processor to perform the foregoing image color adjustment method.

In order to resolve the foregoing technical problem, the embodiments of the disclosure adopt another technical solution as follows: A nonvolatile computer readable storage medium is provided. The nonvolatile computer readable storage medium stores computer executable instructions. The computer executable instructions cause an image collection device of a UAV to perform the foregoing image color adjustment method.

The advantageous effects of the embodiments of the invention are as follows. Different from the prior art, the embodiments of the disclosure provide an image color adjustment method and apparatus and a UAV. In the image color adjustment method, the optimal color channel gain matching the current exposure and the current color temperature of the image collection device during the collection of the to-be-processed image that are determined is selected to adjust the color of the to-be-processed image. Therefore, the color style of the to-be-processed image may be changed with an actual photographing status. In this way, the to-be-processed image accurately reflects a color of a subject and presents a variety of color styles.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

FIG. 1 is a schematic structural diagram of a UAV according to an embodiment of the disclosure.

FIG. 2 is a schematic flowchart of an image color adjustment method according to an embodiment of the disclosure.

DETAILED DESCRIPTION

Figure 3:
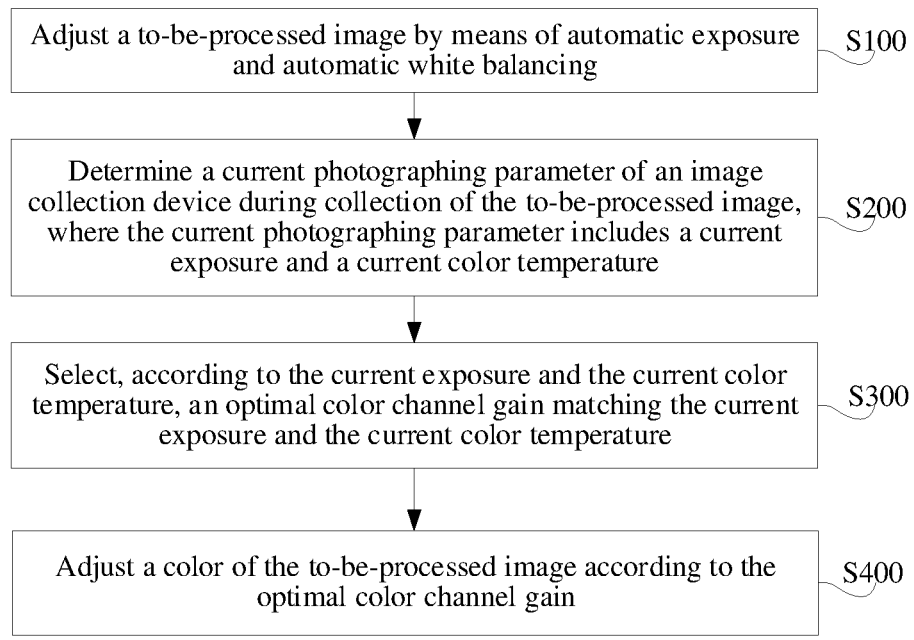
FIG. 3 is a schematic flowchart of an image color adjustment method according to another embodiment of the disclosure.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present invention rather than all of the embodiments.

It should be understood that the specific embodiments described herein are merely used to explain the present invention but are not intended to limit the present invention. All other embodiments obtained by a person of ordinary skill in the art based on the disclosed embodiments without creative efforts shall fall within the protection scope of the present invention. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", and similar expressions used in this specification are merely used for an illustrative purpose.

In addition, technical features involved in each embodiment of the present invention described below may be combined together if there is no conflict.

The disclosure provides an image color adjustment method and apparatus. The method and the apparatus are applicable to an image collection device of a UAV. By means of the method and the apparatus, the image collection device can adaptively select an optimal color channel gain to adjust colors of aerial videos and images according to an actual photographing status after aerial photography. Therefore, the captured videos and images can accurately reflect colors of a subject and present a variety of color styles. The UAV may be any suitable type of high-altitude UAV or low-altitude UAV loaded with an image collection device for aerial photography. The UAV includes a fixed-wing UAV, a rotary-wing UAV, a para-wing UAV, a flapping-wing UAV, or the like.

The disclosure is described below by using specific embodiments.

Embodiment I

FIG. 1 shows a UAV 100 according to an embodiment of the disclosure. The UAV includes a fuselage 10, an arm 20, a power apparatus 30, an image collection device 40, a landing gear 50 and a flight control system (not shown). The arm 20, the image collection device 40 and the landing gear 50 are all connected to the fuselage 10. The flight control system is configured in the fuselage 10. The power apparatus 30 is disposed on the arm 20. The power apparatus 30, the image collection device 40 and the landing gear 50 are all communicatively connected to the flight control system. Therefore, the flight control system can control the UAV 100 to fly by using the power apparatus 30, and can control the image collection device 40 to perform aerial photography and control the landing gear 50 to open and close.

Preferably, the arm 20 includes 4 arms. The four arms are evenly distributed around the fuselage 10 and each are configured to carry the power apparatus 30.

The power apparatus 30 includes a motor disposed on the arm and a propeller connected to a shaft of the motor. The motor can drive the propeller to rotate to provide lift for the UAV 100 for flight. The motor can further change a flight direction of the UAV 100 by changing a rotation speed and a rotation direction of the propeller. When the power apparatus 30 is communicatively connected to the flight control system, the flight control system can control the UAV 100 to fly by controlling the motor.

The power apparatus 30 is disposed at an end of the arm 20 that is not connected to the fuselage 10, and is connected to the arm 20 by the motor.

Preferably, the 4 arms of the UAV 100 each have a power apparatus 30 disposed thereon to cause the UAV 100 to fly stably.

The image collection device 40 may be a device capable of capturing videos and images, such as a camera or a video recorder. The image collection device is disposed at a bottom of the fuselage 10 and may be controlled by the flight control system to perform aerial photography, that is, capture videos and images. The image collection device 40 may alternatively be disposed on the bottom of the fuselage 10 by using a gimbal, to rotate with the gimbal. In this way, aerial photography can be performed in all directions to capture videos and images from different angles.

Further, During the flight of the UAV 100, the image collection device 40 is further configured to perform an image color adjustment method to cause videos and images captured in different photographing environments to present different color styles. The image collection device adaptively selects an optimal color channel gain to adjust colors of the aerial videos and images according to the actual photographing status. Therefore, the color styles of the aerial videos and images can be changed with the actual photographing status.

The landing gear 50 is disposed on two opposite sides of the bottom of the fuselage 10, and is connected to the fuselage 10 by a driving apparatus. The landing gear 50 may be driven by the driving apparatus to unfold and fold. When the UAV 100 is to come into contact with the ground, the driving apparatus controls the landing gear 50 to unfold. Therefore, the UAV 100 comes into contact with the ground by using the landing gear 50. During the flight of the UAV 100, the driving apparatus controls the landing gear 50 to fold to prevent the landing gear 50 from affecting the flight of the UAV 100. When the landing gear 50 is communicatively connected to the flight control system, the flight control system may control the landing gear 50 to unfold and fold by controlling the driving apparatus.

The flight control system is communicatively connected to the power apparatus 30, the image collection device 40 and the landing gear 50 wiredly or wirelessly. The wireless connection includes but is not limited to Wi-Fi, Bluetooth and ZigBee.

Performing the image color adjustment method by the image collection device 40 specifically includes: after capturing videos and images, determining, by the image collection device 40, a to-be-processed image from the captured videos and images.

The to-be-processed image is composed of a plurality of pixels arranged in rows. Each pixel corresponds to an RGB color value. The to-be-processed image may be an image frame of the videos captured by the image collection device 40, or may be an image captured by the image collection device 40.

The videos and the images captured by the image collection device 40 are videos and images processed by automatic exposure and automatic white balancing. Therefore, the videos and the images can accurately reflect a color of a subject.

After determining the to-be-processed image, the image collection device 40 determines a current photographing parameter during the photographing of the to-be-processed image. The current photographing parameter includes a current exposure and a current color temperature.

The current exposure is an exposure during the automatic exposure of the to-be-processed image. The current exposure of the to-be-processed image may be determined by using a gain and a shutter during the automatic exposure of the to-be-processed image by the image collection device 40. For example, the current exposure is calculated by using a product of a quantity of exposure lines and a gain.

The current color temperature is an environmental color temperature determined during the automatic white balancing of the to-be-processed image. The environmental color temperature may be determined during the automatic white balancing of the to-be-processed image by the image collection device 40.

In order to determine the current color temperature, a ratio of a predefined-color average value to a green-color average value is required to be calculated first for all white pixels in the to-be-processed image. A preset color temperature curve is then acquired. Finally, the current color temperature is determined according to the acquired preset color temperature curve and the calculated ratio.

The white pixels are pixels in a predefined high grayscale range. The predefined high grayscale range is a grayscale range where all grayscale values are not less than 220. For example, a grayscale range 190-240 is not a predefined high grayscale range. This is because some grayscale values in the grayscale range are less than 220. A grayscale range 230-255 is a predefined high grayscale range. This is because all grayscale values in the grayscale range are not less than 220.

Preferably, the predefined high grayscale range is 220-255, and includes two end values 220 and 255.

When the predefined high grayscale range is 220-255, if a grayscale value of a pixel is less than 220, it is determined that the pixel is not a white pixel. Otherwise, it is determined that the pixel is a white pixel. For example, it is assumed that an RGB color value of a pixel A is (251,246,246) and an RGB color value of a pixel B is (219,191,186). By means of the floating-point arithmetic, a grayscale value of the pixel A is calculated as 247.5, and a grayscale value of the pixel B is calculated as 198.85. Since the grayscale value 247.5 of the pixel A is greater than 220, it is determined that the pixel A is a white pixel. Since the grayscale value 198.85 of the pixel B is less than 220, it is determined that the pixel B is not a white pixel.

Since each pixel of the to-be-processed image corresponds to an RGB color value, the predefined-color average value includes a red-color average value or a blue-color average value.

When the predefined-color average value is a red-color average value, a ratio (R/G) of a red-color average value to a green-color average value is calculated for all of the white pixels in the to-be-processed image.

When the predefined-color average value is a blue-color average value, a ratio (B/G) of a blue-color average value to the green-color average value is calculated for all of the white pixels in the to-be-processed image.

Further, the preset color temperature curve includes a curve of a relationship between (R/G) and (B/G) and a curve of a relationship between (R/G) or (B/G) and a color temperature. In this case, the current color temperature can be determined by using the preset color temperature curve regardless of whether the ratio of the red-color average value to the green-color average value or the ratio (B/G) of the blue-color average value to the green-color average value is calculated.

After determining the current photographing parameter during the photographing of the to-be-processed image, the image collection device 40 selects, according to the current exposure and the current color temperature that are determined, an optimal color channel gain matching the current exposure and the current color temperature.

Specifically, referring to Table 1, in this embodiment of the disclosure, there are three candidate color temperature index intervals: An interval 1, an interval 2 and an interval 3. Each of the interval 1, the interval 2 and the interval 3 corresponds to two candidate exposures. The interval 1 corresponds to H1 and H2. The interval 2 corresponds to H3 and H4. The interval 3 corresponds to H5 and H6. Each of the candidate exposures H1 and H2 corresponding to interval 1 corresponds to a candidate color channel gain. H1 corresponds to a gain 1, and H2 corresponds to a gain 2. Each of the candidate exposures H3 and H4 corresponding to interval 2 corresponds to a candidate color channel gain. H3 corresponds to a gain 3, and H4 corresponds to a gain 4. Each of the candidate exposures H5 and H6 corresponding to interval 3 corresponds to a candidate color channel gain. H5 corresponds to a gain 5, and H6 corresponds to a gain 6.

The candidate color channel gain includes a color channel type and a gain adjustment value corresponding to the color channel type. The color channel type includes a red channel or a blue channel.

When the color channel type is a red channel, the candidate color channel gain includes a gain adjustment value of the red channel. The gain adjustment value is used to adjust a color value of the red channel.

When the color channel type is a blue channel, the candidate color channel gain includes a gain adjustment value of the blue channel. The gain adjustment value is used to adjust a color value of the blue channel.

TABLE 1

| Candidate color temperature index interval | Candidate exposure | Candidate color channel gain |
|---|---|---|
| Interval 1: <3300 | H1 = 500 | Gain 1 |
|  | H2 = 1000 | Gain 2 |
| Interval 2: 3300-5500 | H3 = 500 | Gain 3 |
|  | H4 = 1000 | Gain 4 |
| Interval 3: >5500 | H5 = 500 | Gain 5 |
|  | H6 = 1000 | Gain 6 |

Each candidate color temperature index interval corresponds to at least two candidate exposures. Each of the at least two candidate exposures corresponds to one candidate color channel gain.

Therefore, the selecting, by the image collection device 40 according to the current exposure and the current color temperature, an optimal color channel gain matching the current exposure and the current color temperature specifically includes the following:

First, the image collection device 40 determines, as a target color temperature index interval, a candidate color temperature index interval including the current color temperature. For example, the image collection device 40 determines that the current color temperature is 3000. It is determined according to Table 1 that a candidate color temperature index interval including the current color temperature of 3000 is the interval 1. Therefore, the interval 1 is determined as the target color temperature index interval.

Then the image collection device 40 determines, as a target exposure, a candidate exposure matching the current exposure from candidate exposures corresponding to the target color temperature index interval. For example, the image collection device 40 determines that the current exposure is 500. It is determined according to Table 1 that candidate exposures corresponding to the interval 1 (the target color temperature index interval) are H1 and H2. It is determined that H1 matches the current exposure of 500. Therefore, H1 is determined as the target exposure.

Finally, the image collection device 40 selects, as the optimal color channel gain, a candidate color channel gain corresponding to the target exposure. For example, it is determined according to Table 1 that a candidate color channel gain corresponding to the target exposure H1 is the gain 1. Therefore, the gain 1 is selected as the optimal color channel gain.

Otherwise, if the candidate exposures corresponding to the target color temperature index interval do not include the candidate exposure matching the current exposure, a target color channel gain corresponding to the current exposure is calculated by means of interpolation calculation, and the target color channel gain is selected as the optimal color channel gain. For example, the image collection device 40 determines that the current exposure is 750. It is determined according to Table 1 that the candidate exposures corresponding to the interval 1 (the target color temperature index interval) are H1 and H2. H1 is 500 and H2 is 1000. Neither matches the current exposure of 750. Therefore, it is determined that the candidate exposures corresponding to the target color temperature index interval do not include the candidate exposure matching the current exposure. In this case, a target color channel gain corresponding to the current exposure is calculated by means of interpolation calculation, and the target color channel gain is selected as the optimal color channel gain.

For example, during the calculation of the target color channel gain corresponding to the current exposure by means of interpolation calculation, the image collection device 40 first determines, as reference color channel gains, at least two candidate color channel gains having a same color channel type from candidate color channel gains corresponding to the determined target color temperature index interval. For example, it is determined that a color channel type of the candidate color channel gain 1 corresponding to the interval 1 (the target color temperature index interval) is a red channel, and a color channel type of the candidate color channel gain 2 corresponding to the interval 1 (the target color temperature index interval) is a red channel. The color channel types of the gain 1 and the gain 2 are the same. Therefore, the gain 1 and the gain 2 are determined as the reference color channel gains.

Then the image collection device 40 determines, as reference exposures, candidate exposures corresponding to the reference color channel gains. For example, when the gain 1 and the gain 2 are the reference color channel gains, since the candidate exposure corresponding to the gain 1 is H1 and the candidate exposure corresponding to the gain 2 is H2, H1 and H2 are determined as the reference exposures.

Then the image collection device 40 constructs an interpolation function according to the determined reference exposures and gain adjustment values of the reference color channel gains. For example, the image collection device 40 determines that the gain adjustment value of the gain 1 is a1, the reference exposure corresponding to the gain 1 is H1, the gain adjustment value of the gain 2 is a2, and the reference exposure corresponding to the gain 2 is H2. Therefore, two relationships (H1, a1) and (H2, a2) are formed. In some embodiments, if there are three or more relationships, the image collection device may determine the interpolation function based on any two of the relationships, or may fit an interpolation function based on the three or more relationships.

Finally, the image collection device 40 calculates the target color channel gain corresponding to the current exposure according to the constructed interpolation function and the current exposure. For example, for (H1, a1), (H2, a2) and the current exposure of 750, the current exposure of 750= (H1+H2)/2. Therefore, a gain adjustment value a3 of the target color channel gain corresponding to the current exposure of 750 is (a1+a2)/2. In addition, the color channel types of the gain 1 and the gain 2 are both a red channel. Therefore, it may be determined that the color channel type of the target color channel gain corresponding to the current exposure is a red channel.

After selecting the optimal color channel gain, the image collection device 40 adjusts a color of the to-be-processed image according to the selected optimal color channel gain.

Specifically, when a color channel type of the selected optimal color channel gain is a red channel, a color value of the red channel is increased or reduced by using a gain adjustment value of the selected optimal color channel gain. Therefore, the color of the to-be-processed image is redder or greener.

When the color value of the red channel is increased by using the gain adjustment value, the color of the to-be-processed image is redder. When the color value of the red channel is reduced by using the gain adjustment value, the color of the to-be-processed image is greener.

When the color channel type of the selected optimal color channel gain is a blue channel, a color value of the blue channel is increased or reduced by using the gain adjustment value of the selected optimal color channel gain. Therefore, the color of the to-be-processed image is bluer or yellower.

When the color value of the blue channel is increased by using the gain adjustment value, the color of the to-be-processed image is bluer. When the color value of the blue channel is reduced by using the gain adjustment value, the color of the to-be-processed image is yellower.

In this embodiment of the disclosure, the image collection device 40 of the UAV 100 performs the image color adjustment method to adaptively select the optimal color channel gain according to the actual photographing status after aerial photography to adjust the colors of the aerial videos and images. Therefore, the aerial videos and images can present a variety of color styles.

Embodiment II

FIG. 2 is a schematic flowchart of an image color adjustment method according to an embodiment of the disclosure. The image color adjustment method is applicable to a UAV. The UAV is the UAV 100 in the foregoing embodiments. The method provided in this embodiment of the disclosure is performed by the foregoing image collection device 40. The image collection device adaptively selects an optimal color channel gain according to an actual photographing status to adjust a color of a to-be-processed image, so that the to-be-processed image can present a variety of color styles. The image color adjustment method includes the following steps:

S200: Determine a current photographing parameter of the image collection device during collection of a to-be-processed image, where the current photographing parameter includes a current exposure and a current color temperature.

The to-be-processed image is composed of a plurality of pixels arranged in rows. Each pixel corresponds to an RGB color value. The to-be-processed image may be an image frame of the videos captured by the image collection device 40, or may be an image captured by the image collection device 40.

The videos and the images captured by the image collection device 40 are videos and images processed by automatic exposure and automatic white balancing. Therefore, the videos and the images can accurately reflect a color of a subject.

The current exposure is an exposure during the automatic exposure of the to-be-processed image. The current exposure of the to-be-processed image may be determined by using a gain and a shutter during the automatic exposure of the to-be-processed image by the image collection device 40. For example, the current exposure is calculated by using a product of a quantity of exposure lines and a gain.

The current color temperature is an environmental color temperature determined during the automatic white balancing of the to-be-processed image. The environmental color temperature may be determined during the automatic white balancing of the to-be-processed image by the image collection device 40.

In order to determine the current color temperature, a ratio of a predefined-color average value to a green-color average value is required to be calculated first for all white pixels in the to-be-processed image. A preset color temperature curve is then acquired. Finally, the current color temperature is determined according to the acquired preset color temperature curve and the calculated ratio.

The white pixels are pixels in a predefined high grayscale range. The predefined high grayscale range is a grayscale range where all grayscale values are not less than 220. For example, a grayscale range 190-240 is not a predefined high grayscale range. This is because some grayscale values in the grayscale range are less than 220. A grayscale range 230-255 is a predefined high grayscale range. This is because all grayscale values in the grayscale range are not less than 220.

Preferably, the predefined high grayscale range is 220-255, and includes two end values 220 and 255.

When the predefined high grayscale range is 220-255, if a grayscale value of a pixel is less than 220, it is determined that the pixel is not a white pixel. Otherwise, it is determined that the pixel is a white pixel. For example, it is assumed that an RGB color value of a pixel A is (251,246,246) and an RGB color value of a pixel B is (219,191,186). By means of the floating-point arithmetic, a grayscale value of the pixel A is calculated as 247.5, and a grayscale value of the pixel B is calculated as 198.85. Since the grayscale value 247.5 of the pixel A is greater than 220, it is determined that the pixel A is a white pixel. Since the grayscale value 198.85 of the pixel B is less than 220, it is determined that the pixel B is not a white pixel.

Since each pixel of the to-be-processed image corresponds to an RGB color value, the predefined-color average value includes a red-color average value or a blue-color average value.

When the predefined-color average value is a red-color average value, a ratio (R/G) of a red-color average value to a green-color average value is calculated for all of the white pixels in the to-be-processed image.

When the predefined-color average value is a blue-color average value, a ratio (B/G) of a blue-color average value to the green-color average value is calculated for all of the white pixels in the to-be-processed image.

Further, the preset color temperature curve includes a curve of a relationship between (R/G) and (B/G) and a curve of a relationship between (R/G) or (B/G) and a color temperature. In this case, the current color temperature can be determined by using the preset color temperature curve regardless of whether the ratio of the red-color average value to the green-color average value or the ratio (B/G) of the blue-color average value to the green-color average value is calculated.

S300: Select, according to the current exposure and the current color temperature, an optimal color channel gain matching the current exposure and the current color temperature.

Specifically, referring to Table 1, in this embodiment of the disclosure, there are three candidate color temperature index intervals: An interval 1, an interval 2 and an interval 3. Each of the interval 1, the interval 2 and the interval 3 corresponds to two candidate exposures. The interval 1 corresponds to H1 and H2. The interval 2 corresponds to H3 and H4. The interval 3 corresponds to H5 and H6. Each of the candidate exposures H1 and H2 corresponding to interval 1 corresponds to a candidate color channel gain. H1 corresponds to a gain 1, and H2 corresponds to a gain 2. Each of the candidate exposures H3 and H4 corresponding to interval 2 corresponds to a candidate color channel gain. H3 corresponds to a gain 3, and H4 corresponds to a gain 4. Each of the candidate exposures H5 and H6 corresponding to interval 3 corresponds to a candidate color channel gain. H5 corresponds to a gain 5, and H6 corresponds to a gain 6.

The candidate color channel gain includes a color channel type and a gain adjustment value corresponding to the color channel type. The color channel type includes a red channel or a blue channel.

When the color channel type is a red channel, the candidate color channel gain includes a gain adjustment value of the red channel. The gain adjustment value is used to adjust a color value of the red channel.

When the color channel type is a blue channel, the candidate color channel gain includes a gain adjustment value of the blue channel. The gain adjustment value is used to adjust a color value of the blue channel.

Each candidate color temperature index interval corresponds to at least two candidate exposures. Each of the at least two candidate exposures corresponds to one candidate color channel gain.

Therefore, the selecting, according to the current exposure and the current color temperature, an optimal color channel gain matching the current exposure and the current color temperature specifically includes the following:

A candidate color temperature index interval including the current color temperature is first determined as a target color temperature index interval. For example, it is determined that the current color temperature is 3000. It is determined according to Table 1 that a candidate color temperature index interval including the current color temperature of 3000 is the interval 1. Therefore, the interval 1 is determined as the target color temperature index interval.

A candidate exposure matching the current exposure is determined as a target exposure from candidate exposures corresponding to the target color temperature index interval. For example, it is determined that the current exposure is 500. It is determined according to Table 1 that candidate exposures corresponding to the interval 1 (the target color temperature index interval) are H1 and H2. It is determined that H1 matches the current exposure of 500. Therefore, H1 is determined as the target exposure.

Finally, a candidate color channel gain corresponding to the target exposure is determined as the optimal color channel gain. For example, it is determined according to Table 1 that a candidate color channel gain corresponding to the target exposure H1 is the gain 1. Therefore, the gain 1 is selected as the optimal color channel gain.

Further, in another embodiment of the disclosure, if the candidate exposures corresponding to the target color temperature index interval do not include the candidate exposure matching the current exposure, a target color channel gain corresponding to the current exposure is calculated by means of interpolation calculation, and the target color channel gain is selected as the optimal color channel gain. For example, it is determined that the current exposure is 750. It is determined according to Table 1 that the candidate exposures corresponding to the interval 1 (the target color temperature index interval) are H1 and H2. H1 is 500 and H2 is 1000, neither of which matches the current exposure of 750. Therefore, it is determined that the candidate exposures corresponding to the target color temperature index interval do not include the candidate exposure matching the current exposure. In this case, a target color channel gain corresponding to the current exposure is calculated by means of interpolation calculation, and the target color channel gain is selected as the optimal color channel gain.

For example, during the calculation of the target color channel gain corresponding to the current exposure by means of interpolation calculation, at least two candidate color channel gains having a same color channel type are determined as reference color channel gains from candidate color channel gains corresponding to the determined target color temperature index interval. For example, it is determined that a color channel type of the candidate color channel gain 1 corresponding to the interval 1 (the target color temperature index interval) is a red channel, and a color channel type of the candidate color channel gain 2 corresponding to the interval 1 (the target color temperature index interval) is a red channel. The color channel types of the gain 1 and the gain 2 are the same. Therefore, the gain 1 and the gain 2 are determined as the reference color channel gains.

Then candidate exposures corresponding to the reference color channel gains are determined as reference exposures. For example, when the gain 1 and the gain 2 are the reference color channel gains, since the candidate exposure corresponding to the gain 1 is H1 and the candidate exposure corresponding to the gain 2 is H2, H1 and H2 are determined as the reference exposures.

Then an interpolation function is constructed according to the determined reference exposures and gain adjustment values of the reference color channel gains. For example, it is determined that the gain adjustment value of the gain 1 is a1, the reference exposure corresponding to the gain 1 is H1, the gain adjustment value of the gain 2 is a2, and the reference exposure corresponding to the gain 2 is H2. Therefore, two relationships (H1, a1) and (H2, a2) are formed. In some embodiments, if there are three or more relationships, the interpolation function may be determined based on any two of the relationships, or may be fitted based on the three or more relationships.

Finally, the target color channel gain corresponding to the current exposure is calculated according to the constructed interpolation function and the current exposure. For example, for (H1, a1), (H2, a2) and the current exposure of 750, the current exposure of 750=(H1+H2)/2. Therefore, a gain adjustment value a3 of the target color channel gain corresponding to the current exposure of 750 is (a1+a2)/2. In addition, the color channel types of the gain 1 and the gain 2 are both a red channel. Therefore, it may be determined that the color channel type of the target color channel gain corresponding to the current exposure is a red channel.

S400: Adjust a color of the to-be-processed image according to the optimal color channel gain.

Specifically, when a color channel type of the selected optimal color channel gain is a red channel, a color value of the red channel is increased or reduced by using a gain adjustment value of the selected optimal color channel gain. Therefore, the color of the to-be-processed image is redder or greener.

When the color value of the red channel is increased by using the gain adjustment value, the color of the to-be-processed image is redder. When the color value of the red channel is reduced by using the gain adjustment value, the color of the to-be-processed image is greener.

When the color channel type of the selected optimal color channel gain is a blue channel, a color value of the blue channel is increased or reduced by using the gain adjustment value of the selected optimal color channel gain. Therefore, the color of the to-be-processed image is bluer or yellower.

When the color value of the blue channel is increased by using the gain adjustment value, the color of the to-be-processed image is bluer. When the color value of the blue channel is reduced by using the gain adjustment value, the color of the to-be-processed image is yellower.

Referring to FIG. 3, in another embodiment of the disclosure, before step S200, the method further includes the following step:

S100: Adjust the to-be-processed image by means of automatic exposure and automatic white balancing.

Before the current photographing parameter of the image collection device during collection of the to-be-processed image is determined, the to-be-processed image is adjusted by means of automatic exposure and automatic white balancing. Therefore, the image collection device 40 can determine the current color temperature and the current exposure.

In this embodiment of the disclosure, the optimal color channel gain matching the current exposure and the current color temperature of the image collection device during the collection of the to-be-processed image that are determined is selected to adjust the color of the to-be-processed image. Therefore, the color style of the to-be-processed image may be changed with an actual photographing status. In this way, the to-be-processed image accurately reflects a color of a subject and presents a variety of color styles.

Embodiment III

The term "module" used below is a combination of software and/or hardware that can implement predetermined functions. Although the apparatuses described in the following embodiments can be implemented by software, implementation by hardware or a combination of software and hardware is also possible.

Figure 4:
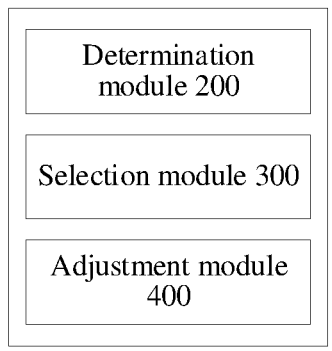
FIG. 4 is a schematic structural diagram of an image color adjustment apparatus according to an embodiment of the disclosure.

FIG. 4 shows an image color adjustment apparatus according to an embodiment of the disclosure. The apparatus is applicable to a UAV. The UAV is the UAV 100 in the foregoing embodiments. The functions of the modules of the apparatus provided in this embodiment of the disclosure is performed by the foregoing image collection device 40. The image collection device adaptively selects an optimal color channel gain according to an actual photographing status to adjust a color of a to-be-processed image, so that the to-be-processed image can present a variety of color styles. The image color adjustment apparatus includes:
   a determination module 200, configured to determine a current photographing parameter of the image collection device during collection of a to-be-processed image, where the current photographing parameter includes a current exposure and a current color temperature;
   a selection module 300, configured to select, according to the current exposure and the current color temperature, an optimal color channel gain matching the current exposure and the current color temperature; and
   an adjustment module 400, configured to adjust a color of the to-be-processed image according to the optimal color channel gain.

In an embodiment of the disclosure, each candidate color temperature index interval corresponds to at least two candidate exposures, and each of the at least two candidate exposures corresponds to one candidate color channel gain.
   The selection module 300 is further configured to:
   determine, as a target color temperature index interval, a candidate color temperature index interval including the current color temperature;
   determine, as a target exposure, a candidate exposure matching the current exposure from candidate exposures corresponding to the target color temperature index interval; and
   select, as the optimal color channel gain, a candidate color channel gain corresponding to the target exposure.

In an embodiment of the disclosure, the selection module 300 is further configured to:
   if the candidate exposures corresponding to the target color temperature index interval do not include the candidate exposure matching the current exposure, calculate a target color channel gain corresponding to the current exposure by means of interpolation calculation, and select the target color channel gain as the optimal color channel gain.

In an embodiment of the disclosure, the candidate color channel gain includes a color channel type and a gain adjustment value corresponding to the color channel type.

In an embodiment of the disclosure, the selection module 300 is further configured to:
   determine, as reference color channel gains, at least two candidate color channel gains having a same color channel type from candidate color channel gains corresponding to the target color temperature index interval;
   determine, as reference exposures, candidate exposures corresponding to the reference color channel gains;
   construct an interpolation function according to the reference exposures and gain adjustment values of the reference color channel gains; and
   calculate the target color channel gain corresponding to the current exposure according to the interpolation function and the current exposure.

In an embodiment of the disclosure, the color channel type includes a red channel or a blue channel.
   The adjustment module 400 is further configured to:
   when a color channel type of the optimal color channel gain is a red channel, increase or reduce a color value of the red channel by using the gain adjustment value; or
   when a color channel type of the optimal color channel gain is a blue channel, increase or reduce a color value of the blue channel by using the gain adjustment value.

In an embodiment of the disclosure, when the color channel type of the optimal color channel gain is a red channel, the color of the to-be-processed image is redder or greener.

In an embodiment of the disclosure, when the color channel type of the optimal color channel gain is a blue channel, the color of the to-be-processed image is bluer or yellower.

In an embodiment of the disclosure, the determination module 200 is further configured to:
   calculate a ratio of a predefined-color average value to a green-color average value for all white pixels in the to-be-processed image, where the white pixels are pixels in a predefined high grayscale range;
   acquire a preset color temperature curve; and
   determine the current color temperature according to the preset color temperature curve and the ratio.

In an embodiment of the disclosure, the predefined-color average value includes a red-color average value or a blue-color average value.

Figure 5:
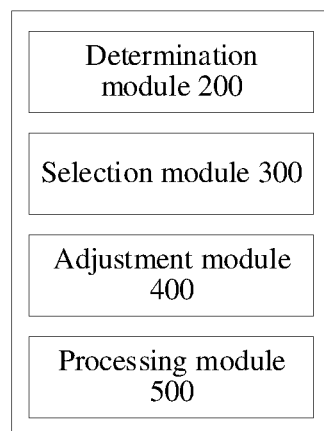
FIG. 5 is a schematic structural diagram of an image color adjustment apparatus according to another embodiment of the disclosure.

Further, referring to FIG. 5, the image color adjustment apparatus further includes:
   a processing module 500, configured to: before the current photographing parameter of the image collection device during collection of the to-be-processed image is determined, adjust the to-be-processed image by means of automatic exposure and automatic white balancing.

Certainly, in some other alternative embodiments, the foregoing determination module 200, selection module 300, adjustment module 400 and processing module 500 may be image processing chips in the image collection device 40.

Since the apparatus embodiment and the method embodiment are based on the same concept, the content of the apparatus embodiment may be quoted from the method embodiment, provided that the contents do not conflict with each other. Details are not enumerated herein again.

In this embodiment of the disclosure, the optimal color channel gain matching the current exposure and the current color temperature of the image collection device during the collection of the to-be-processed image that are determined is selected to adjust the color of the to-be-processed image. Therefore, the color style of the to-be-processed image may be changed with an actual photographing status. In this way, the to-be-processed image accurately reflects a color of a subject and presents a variety of color styles.

Embodiment IV

Figure 6:
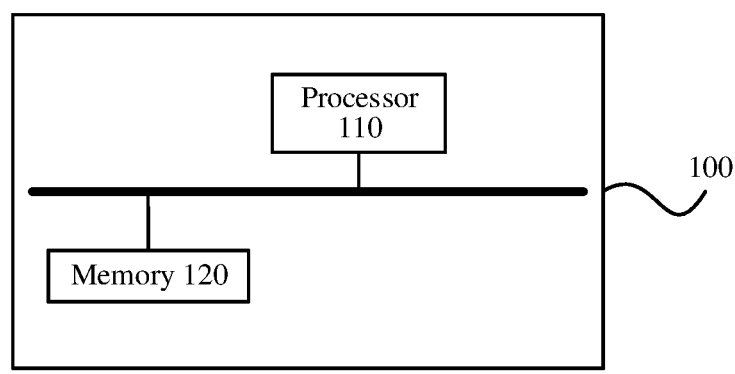
FIG. 6 is a schematic structural diagram of hardware of a UAV according to an embodiment of the disclosure.

FIG. 6 is a schematic structural diagram of hardware of a UAV according to an embodiment of the disclosure. Hardware modules provided in this embodiment of the disclosure may be integrated into the image collection device 40 in the foregoing embodiments. Therefore, the UAV 100 can perform the image color adjustment method in the foregoing embodiments and can achieve the functions of the modules of the image color adjustment apparatus in the foregoing embodiments. The UAV 100 includes
one or more processors 110 and a memory 120. In FIG. 6, the UAV includes one processor 110, for example.

The processor 110 and the memory 120 may be connected by a bus or in other manners. In FIG. 6, the processor and the memory are connected by a bus, for example.

As a non-volatile computer readable storage medium, the memory 120 may be configured to store a non-volatile software program, a non-volatile computer executable program, and a module. For example, the memory may be configured to store program instructions corresponding to the image color adjustment method and the modules (for example, the determination module 200, the selection module 300 and the adjustment module 400) corresponding to the image color adjustment apparatus in the foregoing embodiments of the disclosure. The processor 110 executes various functional applications and data processing of the image color adjustment method by executing a non-volatile software program, an instruction and a module stored in the memory 120. That is to say, the processor implements the image color adjustment method in the foregoing method embodiment and the functions of the modules in the foregoing apparatus embodiment.

The memory 120 may include a program storage area and a data storage area. The program storage area may store an operating system and an application program required for at least one function. The data storage area may store data created according to the use of the image color adjustment apparatus and the like.

The data storage area is further stored with preset data, including candidate exposure, a candidate color temperature index interval, candidate color channel gain, a predefined color, a predefined high grayscale range, and a preset color temperature curve, and the like.

In addition, the memory 120 may include a high speed RAM, and may further include a non-volatile memory, such as at least one magnetic disk storage device, a flash memory, or another volatile solid storage device. In some embodiments, the memory 120 may alternatively include memories remotely disposed relative to the processor 110, and the remote memories may be connected to the processor 110 through a network. Examples of the network include, but are not limited to, the Internet, an intranet, a local area network, a mobile communication network, and a combination thereof.

The program instructions and one or more modules are stored in the memory 120, the program instructions and one or more modules, when executed by the one more processors 110, performing each step of the image color adjustment method according to any one of the foregoing method embodiments, or, implementing functions of each module of the image color adjustment apparatus according to any one of the foregoing apparatus embodiments.

The foregoing products may perform the method provided by the foregoing embodiments of the present invention, and has function modules corresponding to the method performing and beneficial effects. For the technical details which are not described in detail in this embodiment, reference may be made to the method provided by the foregoing embodiments of the present invention.

The embodiments of the present invention further provide a non-volatile computer storage medium storing computer executable instructions, the computer executable instructions, when executed by one or more processors, for example, the processor 110 shown in FIG. 6, being able to cause the computer to implement each step of the image color adjustment method according to any one of the foregoing method embodiments, or implementing functions of each module of the image color adjustment apparatus according to any one of the foregoing apparatus embodiments.

The embodiments of the present invention further provide a computer program product including a computer program stored on the non-volatile computer storage medium, the computer program including program instructions, the program instructions, when executed by one or more processors, for example, the processor 110 shown in FIG. 6, being able to cause the computer to implement each step of the image color adjustment method according to any one of the foregoing method embodiments, or implementing functions of each module of the image color adjustment apparatus according to any one of the foregoing apparatus embodiments.

The foregoing described apparatus embodiments are merely examples. The modules described as separate parts may or may not be physically separate, and the parts displayed as modules may or may not be physical units, may be located in one position, or may be distributed on a plurality of network units. Some or all of the modules may be selected according to actual needs to achieve the objectives of the solutions of the embodiments.

It may be learned from description of the foregoing embodiments that, a person of ordinary skill in the art may clearly understand that each embodiment may be implemented by using software and a universal hardware platform, or by using hardware. A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may include a magnetic disc, an optical disc, a read-only memory (ROM), a random access memory (RAM), or the like.

The foregoing descriptions are merely embodiments of the present invention and are not intended to limit the present invention. All equivalent structure and equivalent flow transformations that are directly or indirectly applied in other related technical field by using the content of the specification and accompanying drawings of the present invention shall fall within the protection scope of the present invention.

Finally, it should be noted that: the foregoing embodiments are merely used for describing the technical solutions of the present invention, but are not intended to limit the present invention. Under the ideas of the present invention, the technical features in the foregoing embodiments or different embodiments may also be combined, the steps may be performed in any order, and many other changes of different aspects of the present invention also exists as described above, and these changes are not provided in detail for simplicity. Although the present invention is described in detail with reference to the foregoing embodiments, it should be appreciated by a person skilled in the art that, modifications may still be made to the technical solutions described in the foregoing embodiments, or equivalent replacements may be made to the part of the technical features; and these modifications or replacements will not cause the essence of corresponding technical solutions to depart from the scope of the technical solutions in the embodiments of the present invention.

What is claimed is:

1. An image color adjustment method, applicable to an image collection device of an unmanned aerial vehicle (UAV), the method comprising:
    determining a current photographing parameter of the image collection device during collection of a to-be-processed image, wherein the current photographing parameter comprises a current exposure and a current color temperature;
    selecting, according to the current exposure and the current color temperature, an optimal color channel gain matching the current exposure and the current color temperature; and
    adjusting a color of the to-be-processed image according to the optimal color channel gain;
    wherein the selecting, according to the current exposure and the current color temperature, an optimal color channel gain matching the current exposure and the current color temperature further comprises:
        determining, as a target color temperature index interval, a candidate color temperature index interval comprising the current color temperature, wherein the candidate color temperature index interval corresponds to at least two candidate exposures, and each of the at least two candidate exposures corresponds to one candidate color channel gain;
        determining, as a target exposure, a candidate exposure matching the current exposure from the at least two candidate exposures corresponding to the target color temperature index interval; and
        selecting, as the optimal color channel gain, a candidate color channel gain corresponding to the target exposure.

2. The method according to claim 1, further comprising:
    when the candidate exposures corresponding to the target color temperature index interval do not comprise the candidate exposure matching the current exposure, calculating a target color channel gain corresponding to the current exposure by means of interpolation calculation, and selecting the target color channel gain as the optimal color channel gain.

3. The method according to claim 2, wherein the candidate color channel gain comprises a color channel type and a gain adjustment value corresponding to the color channel type.

4. The method according to claim 3, wherein the calculating a target color channel gain corresponding to the current exposure by means of interpolation calculation comprises:
    determining, as reference color channel gains, at least two candidate color channel gains having a same color channel type from candidate color channel gains corresponding to the target color temperature index interval;
    determining, as reference exposures, candidate exposures corresponding to the reference color channel gains;
    constructing an interpolation function according to the reference exposures and gain adjustment values of the reference color channel gains; and
    calculating the target color channel gain corresponding to the current exposure according to the interpolation function and the current exposure.

5. The method according to claim 3, wherein the color channel type comprises a red channel or a blue channel; and
    the adjusting a color of the to-be-processed image according to the optimal color channel gain comprises:
        when a color channel type of the optimal color channel gain is a red channel, increasing or reducing a color value of the red channel by using the gain adjustment value; or
        when a color channel type of the optimal color channel gain is a blue channel, increasing or reducing a color value of the blue channel by using the gain adjustment value.

6. The method according to claim 5, wherein when the color channel type of the optimal color channel gain is a red channel, the color of the to-be-processed image is redder or greener.

7. The method according to claim 5, wherein when the color channel type of the optimal color channel gain is a blue channel, the color of the to-be-processed image is bluer or yellower.

8. The method according to claim 1, wherein before the determining a current photographing parameter of the image collection device during collection of a to-be-processed image, the method further comprises:
    adjusting the to-be-processed image by means of automatic exposure and automatic white balancing.

9. The method according to claim 1, wherein the determining a current color temperature of the image collection device during collection of a to-be-processed image comprises:
    calculating a ratio of a predefined-color average value to a green-color average value for all white pixels in the to-be-processed image, wherein the white pixels are pixels in a predefined high grayscale range;
    acquiring a preset color temperature curve; and
    determining the current color temperature according to the preset color temperature curve and the ratio.

10. The method according to claim 9, wherein the predefined-color average value comprises a red-color average value or a blue-color average value.

11. An image color adjustment apparatus, applied to an image collection device of a UAV, the apparatus comprising:
    at least one processor; and a memory, communicatively connected to the at least one processor, wherein the memory stores instructions executable by the at least one processor, where execution of the instructions by the at least one processor causes the at least one processor to:
    determine a current photographing parameter of the image collection device during collection of a to-be-processed image, wherein the current photographing parameter comprises a current exposure and a current color temperature;

select, according to the current exposure and the current color temperature, an optimal color channel gain matching the current exposure and the current color temperature; and adjust a color of the to-be-processed image according to the optimal color channel gain;

the processor is further configured to:

determine, as a target color temperature index interval, a candidate color temperature index interval comprising the current color temperature; wherein the candidate color temperature index interval corresponds to at least two candidate exposures, and each of the at least two candidate exposures corresponds to one candidate color channel gain;

determine, as a target exposure, a candidate exposure matching the current exposure from the at least two candidate exposures corresponding to the target color temperature index interval; and select, as the optimal color channel gain, a candidate color channel gain corresponding to the target exposure.

12. The apparatus according to claim 11, wherein the processor is further configured to:

when the candidate exposures corresponding to the target color temperature index interval do not comprise the candidate exposure matching the current exposure, calculate a target color channel gain corresponding to the current exposure by means of interpolation calculation, and select the target color channel gain as the optimal color channel gain.

13. The apparatus according to claim 12, wherein the candidate color channel gain comprises a color channel type and a gain adjustment value corresponding to the color channel type.

14. The apparatus according to claim 13, wherein the processor is further configured to:

determine, as reference color channel gains, at least two candidate color channel gains having a same color channel type from candidate color channel gains corresponding to the target color temperature index interval;

determine, as reference exposures, candidate exposures corresponding to the reference color channel gains;

construct an interpolation function according to the reference exposures and gain adjustment values of the reference color channel gains; and calculate the target color channel gain corresponding to the current exposure according to the interpolation function and the current exposure.

15. The apparatus according to claim 13, wherein the color channel type comprises a red channel or a blue channel; and the processor is further configured to:

when a color channel type of the optimal color channel gain is a red channel, increase or reduce a color value of the red channel by using the gain adjustment value; or when a color channel type of the optimal color channel gain is a blue channel, increase or reduce a color value of the blue channel by using the gain adjustment value.

16. The apparatus according to claim 15, wherein when the color channel type of the optimal color channel gain is a red channel, the color of the to-be-processed image is redder or greener.

17. The apparatus according to claim 15, wherein when the color channel type of the optimal color channel gain is a blue channel, the color of the to-be-processed image is bluer or yellower.

18. The apparatus according to claim 1, wherein the processor is further configured to:

before the current photographing parameter of the image collection device during collection of the to-be-processed image is determined, adjust the to-be-processed image by means of automatic exposure and automatic white balancing.

19. The apparatus according to claim 11, wherein the processor is further configured to:

calculate a ratio of a predefined-color average value to a green-color average value for all white pixels in the to-be-processed image, wherein the white pixels are pixels in a predefined high grayscale range;

acquire a preset color temperature curve; and determine the current color temperature according to the preset color temperature curve and the ratio.

20. The apparatus according to claim 19, wherein the predefined-color average value comprises a red-color average value or a blue-color average value.

21. A UAV, comprising:

a fuselage;

an arm, connected to the fuselage;

a power apparatus, disposed on the arm; and an image collection device, connected to the fuselage, wherein the image collection device comprises:

at least one processor; and a memory, communicatively connected to the at least one processor, wherein the memory stores instructions executable by the at least one processor, where execution of the instructions by the at least one processor causes the at least one processor to:

determine a current photographing parameter of the image collection device during collection of a to-be-processed image, wherein the current photographing parameter comprises a current exposure and a current color temperature;

select, according to the current exposure and the current color temperature, an optimal color channel gain matching the current exposure and the current color temperature; and adjust a color of the to-be-processed image according to the optimal color channel gain;

the processor is further configured to:

determine, as a target color temperature index interval, a candidate color temperature index interval comprising the current color temperature; wherein the candidate color temperature index interval corresponds to at least two candidate exposures, and each of the at least two candidate exposures corresponds to one candidate color channel gain;

determine, as a target exposure, a candidate exposure matching the current exposure from the at least two candidate exposures corresponding to the target color temperature index interval; and select, as the optimal color channel gain, a candidate color channel gain corresponding to the target exposure.

* * * * *